United States Patent Office 3,473,364
Patented Oct. 21, 1969

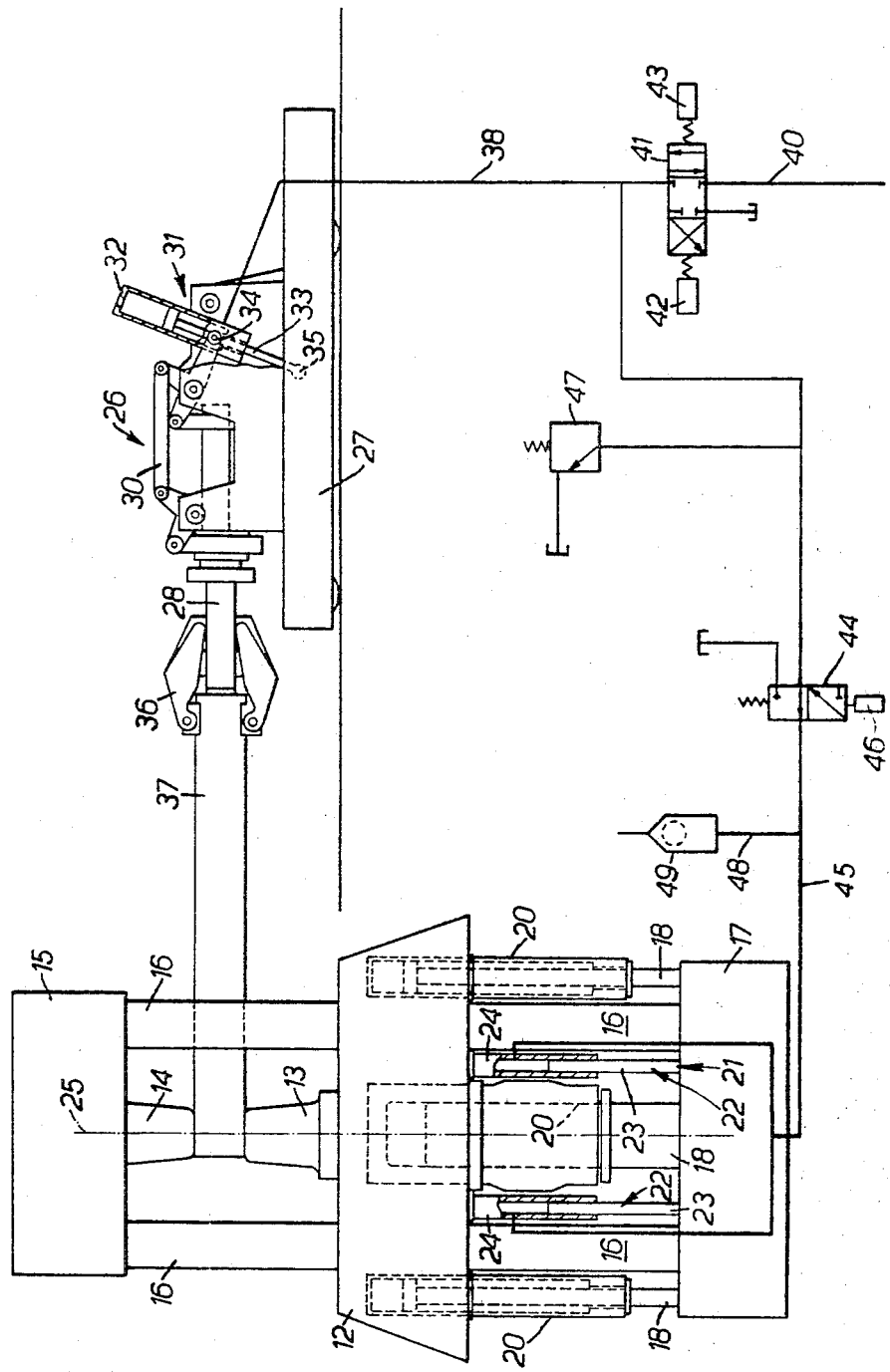

3,473,364
FORGING
Keith Ross, Sheffield, England, assignor to Davy and United Engineering Company Limited, Sheffield, England
Filed Feb. 20, 1967, Ser. No. 617,307
Claims priority, application Great Britain, Feb. 25, 1966, 8,412/66
Int. Cl. B21j 13/10, 9/12
U.S. Cl. 72—421                                 5 Claims

ABSTRACT OF THE DISCLOSURE

A press with an upper movable tool and a lower fixed tool and a manipulator for supporting and feeding an elongated workpiece thereto. Piston and cylinder assemblies are mounted on the upper movable tool and on the manipulator for vertical movement thereof, and fluid pressure means interconnecting the assemblies. The piston and cylinder on the manipulator have substantially twice the cylinder area as the one on the upper movable tool to permit the manipulator to be lowered at half the speed of upper tool during its penetration stroke to avoid bending a workpiece supported thereon.

---

This invention relates to apparatus for controlling the position of a workpiece relative to the tools during forging. When forging between a press having one fixed tool and one moving tool, during the penetration stroke, the workpiece must move towards the fixed tool at a speed of half the speed of the moving tool to avoid bending of the workpiece; and after the penetration stroke the workpiece must be lifted clear of the fixed tool so that it can be traversed through the bite distance ready for the next pressing stroke.

In one aspect the present invention provides forging apparatus comprising a press having a fixed tool carrying crosshead and a moving tool carrying crosshead, a first piston and cylinder assembly mounted on the press for movement with the moving crosshead, a manipulator, a second piston and cylinder assembly mounted on the manipulator and arranged for driving the peel thereof parallel to the direction of movement of the moving crosshead, the second piston and cylinder assembly having a cylinder area substantially twice the cylinder area of the first piston and cylinder assembly, and means connecting the cylinders of the first and second assemblies.

By this arrangement movement of the moving crosshead causes a change in the volume on the drive side of the first piston and cylinder assembly thus causing an equal change of volume on the drive side of the second piston and cylinder assembly, thus automatically driving the peel at half the speed of the moving tool.

Preferably the first piston and cylinder assembly comprises a pair of piston and cylinder units connected in parallel between the fixed and moving crossheads, and the second piston and cylinder assembly comprises a single piston and cylinder unit arranged to raise and lower the peel through a parallel linkage.

Preferably a relief valve is arranged in the connection means to relieve if the pressure exceeds the normal pressure.

One embodiment of forging apparatus in accordance with the invention will now be described, by way of example only, with reference to the accompanying drawing which shows a press and manipulator and peel height control system.

The press is of the drawdown type having a fixed crosshead 12 carrying a fixed tool 13, the moving tool 14 being mounted in an upper moving crosshead 15 connected by columns 16 to a lower moving crosshead 17 which is connected to drive pistons 18 slidable on drive cylinders 20 mounted in the crosshead 12. An additional piston and cylinder assembly 21 comprises two piston and cylinder units 22 each consisting of a piston 23 secured to the crosshead 17 and slidable in a cylinder 24 secured to the crosshead 12. The piston and cylinder units 22 are symmetrically mounted on opposite sides of the press centre line 25.

The manipulator 26 comprises a carriage 27 supporting a peel 28 on a parallel linkage system 30. Mounted on the manipulator is a piston and cylinder unit 31 comprising a cylinder 32 mounted on the carriage 27 and having a piston 33 slidable therein, a mid-point of the cylinder being pivotally connected at 34 to the parallel linkage, and the end of the piston being pivotally connected at 35 to the manipulator carriage 27. Movement of the cylinder on the piston 33 is thus arranged to lower or raise the peel 28 in parallel manner. The peel 28 has jaws 36 in which a workpiece 37 is carried.

The rod side of cylinder 32 is connected by line 38 to a valve 41 operable by a solenoid 42 to connect the line 38 with a reservoir and operable by solenoid 43 to connect the line 38 to a pressurised hydraulic supply on line 40. When in the neutral position shown, valve 41 isolates line 38 from both the pressure line 40 and the reservoir. Line 38 is further connected through a valve 44 to a line 45 connected to each of the cylinders 24. Valve 44 is normally biased to connect line 38 and line 45 but is operable by solenoid 46 to connect line 45 to a reservoir. A relief valve 47 is connected to the line 38 and arranged to connect line 38 to a reservoir if the pressure exceeds a predetermined value. The line 45 is also linked to a low pressure source, through a line 48 via a non-return valve 49, which ensures that cavitation in the hydraulic system does not occur. Without this filling connection cavitation could take place if the workpiece 37 should contact the fixed tool 13 in advance of the moving tool. The effective area of the cylinder 32, in this case, where the line 38 is connected to the rod side of the piston, the area of the cylinder minus the area of the piston rod, is equal to twice the effective area of the cylinders of the piston and cylinder assembly 21, that is in this case the sum of the areas of the cylinders 24.

In operation, the solenoid 42 is initially operated to connect the cylinder 32 with the reservoir. The weight of the workpiece then causes the peel 28 to lower, liquid discharging from the cylinder 31 to the reservoir, until the workpiece is laid on top of the lower tool 13, when further movement is stopped. The press is then closed so that the top tool 14 contacts the forging; during this closing movement of the press, the peel remains stationary, as line 38 remains connected to the reservoir. When the upper tool 14 contacts the workpiece, solenoid 42 is released to disconnect line 38 from the reservoir and to isolate line 38 as described. Further movement of the upper tool, up or down, now causes the manipulator to follow the movement at half the speed, thus maintaining the centre line of the workpiece coincident with the means point between the press tools. The workpiece will be raised clear of the bottom tool as soon as possible after the upper tool is clear of it so that horizontal traverse movement can take place.

Should the peel height be set incorrectly for the initial squeeze and the top tool contact the workpiece before the workpiece contacts the bottom tool, this will cause an extensive pressure in the circuit connecting cylinders 32 and 24 and the relief valve 47 will open which has the effect of zeroing the system.

The system could also be used for synchronising two manipulators with the press and therefore with each other; in this case the arrangement would require duplicating. For one or more manipulators which do not employ a parallel linking mechanism and have separate hoist cylinders for the front and rear ends of the peel, similar circuits to the one shown would be required for each cylinder and would give both parallel motion to the peel as well as a synchronisation with the press movement.

I claim:

1. Forging apparatus comprising a press having a fixed tool-carrying crosshead and a moving tool-carrying crosshead, drive means arranged to displace the moving crosshead relative to the fixed crosshead, a first piston and cylinder assembly mounted on the press for movement with the moving crosshead, a manipulator, a second piston and cylinder assembly mounted on the manipulator and arranged for driving the peel thereof parallel to the direction of the movement of the moving crosshead, the second piston and cylinder assembly having an effective cylinder area substantially twice the cylinder area of the first piston and cylinder assembly, and conduit means connecting the cylinders of the first and second assemblies.

2. Forging apparatus according to claim 1 wherein the first piston and cylinder assembly comprises a pair of piston and cylinder units connected in parallel between the fixed and the moving crossheads, and the second piston and cylinder assembly comprises a single piston and cylinder unit arranged to raise and lower the peel through a parallel linkage.

3. Forging apparatus according to claim 1 wherein the first piston and cylinder assembly comprises a pair of piston and cylinder units connected in parallel between the fixed and moving crossheads, and the second piston and cylinder assembly comprises a pair of piston and cylinder units connected in parallel to the front and rear ends respectively of the peel.

4. Forging apparatus according to claim 1 wherein the conduit means connecting the cylinders of the first and second assemblies includes means for relieving the pressure of fluid to the second assembly when the pressure exceeds a predetermined amount.

5. Forging apparatus according to claim 1 wherein the conduit means connecting the cylinders of the first and second assemblies includes means for introducing fluid thereinto to prevent a cavitation of fluid therein.

References Cited

UNITED STATES PATENTS

| | | | |
|---|---|---|---|
| 2,864,271 | 12/1958 | Kendall | 72—421 X |
| 3,167,978 | 2/1965 | Wistreich et al. | 72—421 |
| 3,274,819 | 9/1966 | Knowles | 72—421 |
| 3,358,486 | 12/1967 | Beard | 72—421 X |

MILTON S. MEHR, Primary Examiner